United States Patent [19]

Taylor

[11] 4,337,536
[45] Jun. 29, 1982

[54] FLYLEAD FOR A VIDEO DISC STYLUS CARTRIDGE

[75] Inventor: Byron K. Taylor, Carmel, Ind.

[73] Assignee: RCA Corporation, New York, N.Y.

[21] Appl. No.: 118,240

[22] Filed: Feb. 4, 1980

[51] Int. Cl.³ .............................................. G11B 9/06
[52] U.S. Cl. .................................................... 369/126
[58] Field of Search ................. 179/100.1 G, 100.1 B,
 179/100.41 R, 100.41 G, 100.41 K, 100.41 P,
 100.41 M, 100.41 Z; 274/37, 38; 358/128.5,
 128.6; 360/10; 369/126, 139, 151, 144

[56] References Cited

U.S. PATENT DOCUMENTS

| Re. 25,597 | 6/1964 | Dieter, Jr. ................... 179/100.41 K |
| 2,412,718 | 12/1946 | Dally et al. ................. 179/100.41 Z |
| 2,543,655 | 2/1951 | Balmer et al. .............. 179/100.41 Z |
| 2,670,962 | 3/1954 | Holtz, Jr. .............................. 274/38 |
| 2,965,378 | 7/1958 | Assie . |
| 3,767,848 | 10/1973 | Schuller et al. .................. 358/128.5 |
| 3,843,846 | 10/1974 | Miller . |
| 4,077,050 | 2/1978 | Dholakia . |

FOREIGN PATENT DOCUMENTS 1524535 9/1978 United Kingdom .

Primary Examiner—Raymond F. Cardillo, Jr.
Attorney, Agent, or Firm—E. M. Whitacre; J. S. Tripoli; E. P. Herrmann

[57] ABSTRACT

A flylead for providing electrical connection to a video disc signal pickup stylus, and exhibiting a prescribed force directed toward the record disc as well as a prescribed compliance to lateral translation. A substantially flat metal flylead element is configured with a respective narrowed region proximate each of its ends to permit the section between the narrowed sections to twist independent of the ends when mounted. The flylead, in its normal play configuration, is elastically deformed in an arc with the narrowed regions outside the region of the arc. A lateral translation of one end of the flylead induces a twisting in the arced portion of the flylead, which twisting relieves the flyleads resistance to such translation.

5 Claims, 5 Drawing Figures

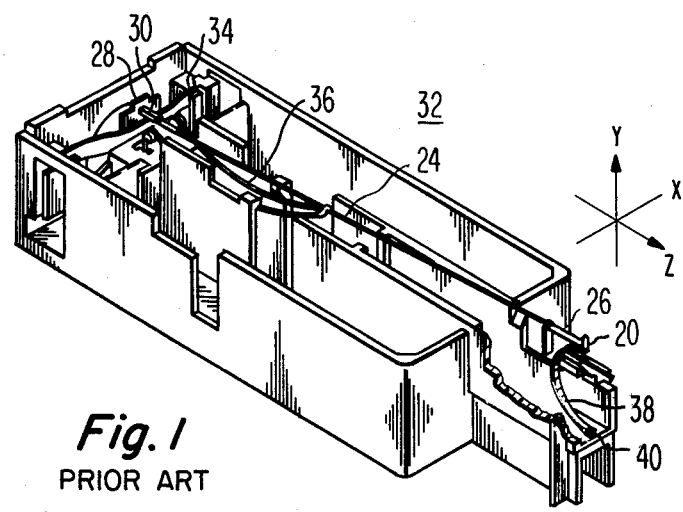
Fig. 1 PRIOR ART
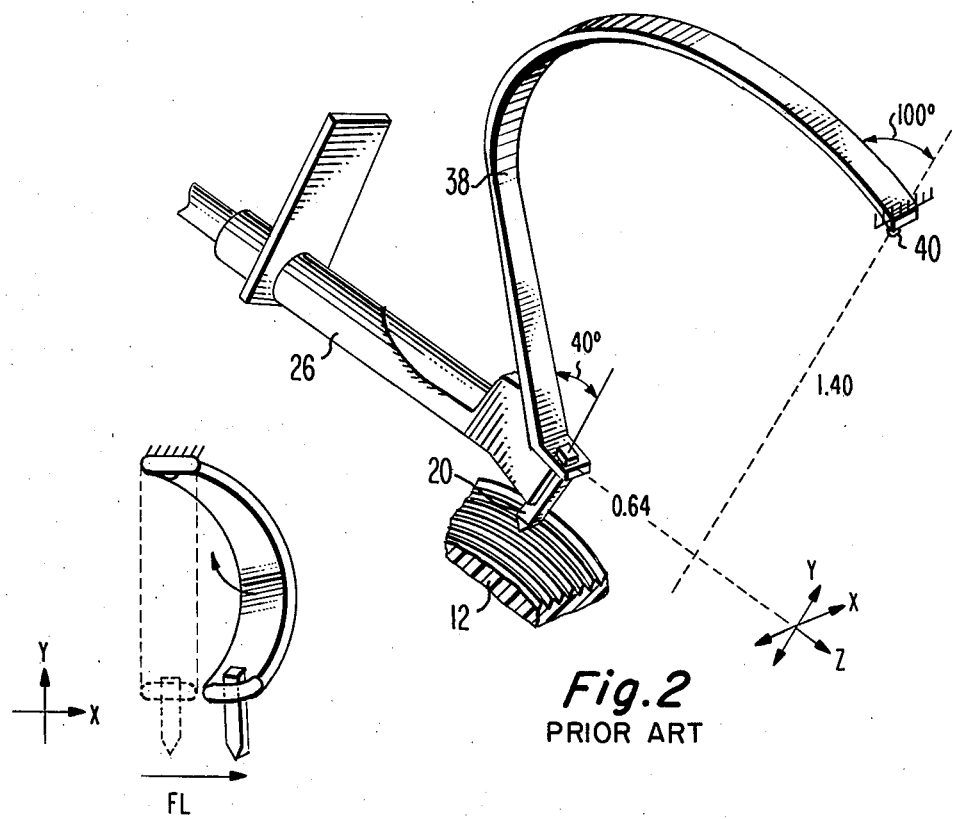
Fig. 2 PRIOR ART
Fig. 3 PRIOR ART

FLYLEAD FOR A VIDEO DISC STYLUS CARTRIDGE

This invention relates to the conductive flylead which interconnects a video disc signal pickup stylus to its signal processing circuitry and provides a nominal compressive force between the stylus and the record disc to aid signal pickup during playback.

Certain capacitive video disc systems incorporate record discs with information recorded by means of geometric variations in a spiral groove on the surface of a record disc. The bulk of the record disc may comprise a homogenous conductive material with a thin dielectric layer disposed on its outer major surfaces. A pickup or signal stylus supported at one end of a stylus arm, and carrying a conductive electrode engages and tracks the groove. The other end of the stylus arm may be compliantly coupled to a carriage. The stylus electrode and conductive record material form a capacitance which capacitance varies temporally as the groove translates with respect to the stylus in accordance with the geometric variations in the groove. Capacitive changes, which are generated when relative motion is established between the stylus and disc are detected and processed to produce video and/or audio signals for subsequent reproduction.

Video disc systems of the aforementioned type may utilize disc records having groove densities in the order of two to three thousand groove convolutions per cm., and in some cases, close to four thousand groove convolutions per cm. A typical video disc record of this type may have a groove convolution spacing in the order of 0.00028 cm. and a groove depth of 0.0001 cm. Such shallow grooves cannot be dependably relied upon to pull the weight of the pickup arm assembly, across the entire recorded surface of the disc record. Therefore, the arm supporting structure (including the carriage) includes a radial drive mechanism for traversing the supported end of the pickup arm in proper time relationship with the radial motion of the signal pickup stylus engaged in the spiral groove so as to continuously maintain the longitudinal axis of the pickup arm substantially tangential to the spiral groove at the point of engagement. A servo system including a sensor for detecting the instantaneous position of the stylus with respect to the carriage assembly controls the rate of radial translation of the carriage and thereby the pickup stylus across the record disc. But due to groove runout or eccentricity, the stylus must be capable of a limited amount of lateral translation independent of the carriage.

A further feature of some systems is the inclusion of a stylus deflection system for selectively causing the stylus to translate across one or more tracks or grooves. This feature permits such special effects as "stop motion" of a video display, or fast forward or reverse scan of the record disc, for example.

As is readily imagined, the relatively small groove dimensions coupled with the relatively large size of the playback apparatus, i.e., the signal pickup stylus assembly and the carriage assembly, requires that the mechanical dynamics of the system be finely tuned. To insure that during playback the pickup stylus does not easily become disengaged from the groove, a positive pressure is provided between the pickup stylus and the record disc. This pressure arises from the weight of the pickup stylus-stylus arm assembly and from the spring forces of a resilient flylead arranged in a prescribed deformation for producing such forces substantially normal to the record disc. The pressure should not be so large as to induce significant stylus or record disc wear, but should be large enough to maintain the stylus and disc in continuous contact to preclude undesirable stylus-disc capacitance variations. The flylead performs the additional function of making electrical connection between the signal pickup stylus and the player electronics.

A flylead designed to provide the prescribed stylus-record pressure and electrical connection is, in general, relatively stiff to motion in a direction normal to the plane defined by the arc of the deformed flylead. This particular direction, related to the playback system, is coincident with the lateral (radial) translation of the stylus across the record disc. For the system to exhibit desirable performance, the stylus should be subject to a very small resistance to lateral motion, e.g., less than 25 dynes. The present inventor realized that the typical flylead constructed of flat material of uniform thickness and either uniform width or tapered width could not simultaneously provide the necessary lateral compliance and the necessary stylus-record disc pressure. This result is a consequence of the flylead being acted upon by shear and not bending forces in the lateral direction. The present inventor further realized that prior flylead arrangements tended to twist when subjected to a lateral force at the end secured to the stylus, imparting an undesirable orientation of the stylus with respect to the groove wall. However, were the flylead able to twist a controlled amount, then the limiting resistance to lateral movement would be afforded in part by the bending and not the shear forces of the flylead due to a reorientation of the body of the flylead.

The present invention comprises a flylead constructed to exhibit reduced resistance to lateral motion of its end connected to the stylus. The flylead is substantially reduced in width in a first region proximate the first end of the flylead and in a second region proximate the second end of the flylead, which first and second regions are generally outside the arced portion of the flylead when deformed in the play position. The narrowed regions permit limited twisting of the section therebetween which in turn reduces the resistance to lateral translation of the end of the flylead attached to the stylus arm.

In the drawings:

FIG. 1 is a perspective view of a video disc cartridge showing a stylus-flylead relationship;

FIG. 2 is an expanded view of a typical prior art stylus-flylead configuration;

FIG. 3 is a diagrammatic illustration of the twisting reaction of a flat flylead subject to a lateral force.

Figure 4:
FIGS. 4 and 5 are examples of flyleads or portions thereof embodying the present invention, which flyleads are shown in the relaxed, unmounted condition.

FIG. 1 illustrates a stylus cartridge 32 of the type that is removably mounted in the aforementioned stylus translation carriage. In the cartridge a signal pickup stylus 20 is secured to the free end of a rigid stylus arm 24 by means of a stylus holder 26. The other end of the stylus arm is secured to a connector plate 28 of magnetic material by means of a compliant coupler 30. The connector plate is suspended in the pickup cartridge 32 by means of a flexible diaphragm 34. A transducer (not shown) magnetically couples with the connector plate to impart limited motion to the pickup stylus in the direction (designated "z") aligned axially with the stylus arm 24 during playback. A U-shaped spring 36 is biased such that the delicate stylus assembly is retained within the confines of the cartridge body when the cartridge is removed from the carriage assembly. A conductive leaf spring 38 (i.e., flylead) deformed to exert a force, in the direction designated "Y" in the drawing, electrically connects the stylus to a terminal 40 secured to the cartridge body.

FIG. 2 illustrates the stylus arm-flylead relationship in more detail for one particular assembly. In the drawing, stylus 20 is shown engaging a grooved record 12 in the play position for the purpose of indicating typical dimensions relating to the stylus system. The simple flylead constructed of a relatively thin, flat, spring material of uniform width is secured at one end to the signal pickup stylus 20 and at its other end to the fixed terminal 40, which points are separated approximately 1.40 centimeters in the vertical direction (designated "Y") and approximately 0.64 centimeters in the direction designated "X". The length of the flylead between the centers of its mounting points is approximately 2.11 centimeters. The ends of the flylead are each constrained to depart from their respective mounting positions at a particular angle with respect to the vertical direction. For the system shown, the stylus holder 26 is designed to establish the angle of departure of the end of the flylead connected thereto at an angle of about 40 degrees while the other end of the flylead is secured at terminal 40 at an angle of about 100 degrees to the vertical. The resulting arc in the flylead provides the desired vertical forces by virtue of the spring or bending forces generated.

The arc in the flylead is formed by causing the "thinner" dimension of the flylead to bend. On the other hand a lateral translation of the stylus 20 in the "X" direction with respect to the fixed terminal 40 tends to cause a bending of the flylead about its longitudinal ends in the plane of the "width" of the flylead. Since the typical flylead material is isotropic, and the flylead width is substantially greater than its thickness, and since the effective length of the lateral moment arm is shorter than the longitudinal dimension of the flylead, the resistance of the flylead to bending to permit a lateral translation of the stylus is substantially greater than in the vertical dimension. However, the overall width of the flylead cannot be reduced to effect the desired lateral compliance consistent with maintaining the desired vertical forces.

A further complication is the requirement that the flylead be fixedly secured at its ends to insure proper electrical connection. The fixed mounting constrains the lateral stylus translation to be responsive totally to the bending of the flylead in the plane of its width which is relatively stiff. Allowing the ends of the flylead to rotate about their mounting points, however, permits the body of the flylead to assume a generally convoluted twist as shown in FIG. 3. The twisting of the flylead effectively limits the resistance to lateral ("X" directed) stylus translation. The force required to cause the twist establishes the lateral compliance of the system, which force tends to a first order effect to be related to the section of the flyhead and only to a second order effect to its thickness. The present inventor realized that the major portion of the flylead could be allowed to twist responsive to lateral stylus translation while constraining the ends of the flylead from rotating in their mountings by substantially reducing the width of the flylead at two regions proximate the two ends as indicated in FIG. 4. These two regions are arranged to be external to the arced portion of the flylead when it is in its deformed or play position and therefore do not appreciably affect the bending forces of the flylead directed in the vertical direction.

FIGS. 4(a) and (b) are two views of an illustrative flylead embodying the present invention shown in its relaxed condition. This flylead has a longitudinal dimension of 2.11 cm. between the centerpoints of the mounting apertures on its respective ends, a width of 0.06 cm. over substantially all of the flylead, and a thickness of 0.0013 cm. Two regions of narrower width are located 0.25 cm. inward from the center of each mounting aperture respectively. These narrow regions are 0.013 cm. wide and extend for a longitudinal distance of 0.06 cm. The relative shortness of the narrowed regions and the fact that they are not located within the arc of deformation generally precludes the flylead bending at these points in consequence of the applied vertical forces. In addition, there is no substantial bending at the narrowed regions in the lateral direction due to opposing lateral forces applied to the ends of the flylead. The principal deformation created in the narrowed region is a convoluted twist. Apparently, imposition of the twist configures an appreciable portion of the bending resistance afforded by the arc deformation to act in the lateral direction and thereby reduce the forces generated by the flylead opposing lateral translation of the stylus. A flylead having the above dimensions and comprised of beryllium copper alloy 25 (1.8-2.0% beryllium, 98.2-98.0% copper) or CA172 has been utilized in an assembly dimensionally similar to the assembly shown in FIG. 2. For the flylead departing from the stylus holder 26 at an angle of about 40 degrees from the vertical, departing from the terminal 40 at an angle of approximately 107 degrees from the vertical and wherein the weight contributed by the stylus assembly to the stylus-record pressure is relatively small compared to the force applied by the flylead, the system exhibited a typical vertical force of 64 dynes and a force resistive to lateral translation of 130 dynes per centimeter. A flylead without such narrowed regions typically exhibits a lateral force of 390 dynes per centimeter.

The foregoing description has generally depicted the flylead as being of uniform width; however, it applies equally to tapered flyleads. In the case of a tapered flylead the lateral dynamics are only marginally affected by the taper relative to the affect on the vertical dynamics. Therefore, inclusion of narrowed regions are desirable to increase lateral compliance.

Figure 5:
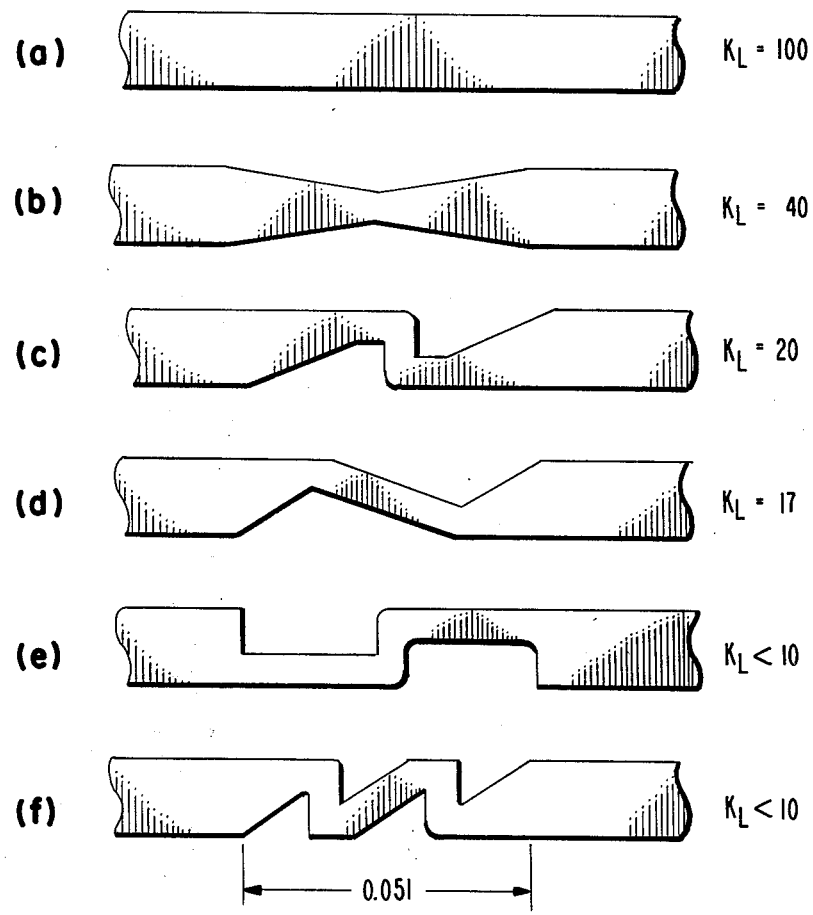

FIGS. 5(a) to 5(d) illustrate a number of variations on the configuration of the narrow regions of the flylead. FIG. 5(a) was used as a standard; the sections 5(b) to 5(f) were duplicated at opposite ends of respective metal strips, the strips then being deformed in accordance with a typical flylead arc. One end of the deformed strip was translated a distance x, the force required to effect the translation was measured, and the effective relative spring constant $K_L$ determined by computation through the equation $F = K_L X$. The constant $K_L$ is a measure of a particular flylead material or configuration resistance to lateral translation or conversely its compliance. For a flylead as described in the foregoing, a material or configuration having a relatively low effective $K_L$ value is desirable.

The values of $K_L$ for the respective rectilinear curved sections are listed adjacent their respective sections. Note that the overall lengths of each of the narrowed regions were made equal and the widths of each of the curved segments in the narrowed regions were made substantially equal. It is readily apparent that a myriad of variations on the narrowed sections may be conceived for producing a desired effective lateral spring constant without straying from the spirit of the invention and the following claims should be construed in this light.

What is claimed is:

1. A video disc stylus assembly of the type including a signal pickup stylus secured to a first end of a stylus arm, the second end thereof being compliantly mounted to a carriage assembly for translating the pickup stylus radially across a disc record, electrical connection to said pickup stylus being effectuated by a conductive leaf spring secured to the carriage assembly and elastically deformed in an arc to provide a prescribed compressive force between the pickup stylus and the disc record, said leaf spring improved to exhibit reduced resistance to movement in a direction radially across the disc record, which improved leaf spring comprises;

a flat, longitudinal electrically conductive resilient element, having substantially uniform width over its length and having first and second regions of narrow width proximate first and second ends of the element, the width of said narrow regions designed to permit a center section located between said narrow regions to twist a limited amount relatively freely with respect to the ends of said element when said element is elastically deformed in said arc between the carriage assembly and the pickup stylus; and wherein the compressive force between the pickup stylus and the disc record is not substantially affected by said narrowed regions.

2. The video disc stylus assembly set forth in claim 1 wherein the leaf spring exhibits an effective spring constant to lateral linear motion of less than 130 dynes per centimeter at its end connected proximate the stylus and an effective spring constant induced by the arced deformation in a direction tending to separate its ends in the range of 100 to 300 dynes per centimeter for the stylus assembly in the normal play position.

3. A stylus assembly as set forth in claim 1 or 2 wherein the narrow regions of said longitudinal element are straight sections integral to said element and having a longitudinal centerline colinear with the centerline of said element.

4. A stylus assembly as set forth in claim 1 or 2 wherein the narrow regions of said longitudinal element comprise first and second sections integral with said longitudinal element, said first and second sections having a substantially narrower width than said longitudinal element and each being configured in a prescribed curve between said center section and the first and second ends respectively.

5. In a disc record playback apparatus of the type including a signal pickup stylus secured at a first end of a stylus arm, the second end thereof being compliantly secured to a carriage assembly for translating the pickup stylus radially across the disc record, a flylead connecting said first end of the stylus arm to the arm carriage comprising:

a leaf spring having a first end secured to the stylus arm proximate the signal pickup stylus and a second end secured to said carriage assembly, said leaf spring deformed in an arc to provide a prescribed compressive force between the pickup stylus and the disc record, said leaf spring having a width W over at least a substantial portion of its length L, and a thickness T which is thin relative to the width W, said leaf spring normally exhibiting an effective spring constant K associated with the width W with respect to displacement of its first end in a direction normal to the plane of said arc of deformation; and means associated with the flylead for reducing said effective spring constant K to a value less than the value normally associated with the dimension W without substantially affecting the compressive force provided between the pickup stylus and the disc record.

* * * * *